(12) United States Patent
Livesay et al.

(10) Patent No.: US 7,252,349 B2
(45) Date of Patent: Aug. 7, 2007

(54) IDLER RECOIL AND ADJUSTMENT SYSTEM FOR TRACK TYPE WORK MACHINE

(75) Inventors: Richard E. Livesay, Peoria, IL (US); Glen A. Spindel, Divernon, IL (US)

(73) Assignee: Caterpillar Inc, Peoria, IL (US)

( * ) Notice: Subject to any disclaimer, the term of this patent is extended or adjusted under 35 U.S.C. 154(b) by 260 days.

(21) Appl. No.: 10/993,733

(22) Filed: Nov. 19, 2004

(65) Prior Publication Data

US 2006/0108870 A1 May 25, 2006

(51) Int. Cl.
*B62D 55/112* (2006.01)

(52) U.S. Cl. .................. 305/143; 305/155

(58) Field of Classification Search ........... 305/143, 305/145, 146, 147, 148, 152, 155
See application file for complete search history.

(56) References Cited

U.S. PATENT DOCUMENTS

| | | | | |
|---|---|---|---|---|
| 2,837,380 A | * | 6/1958 | Mazzarins | 305/148 |
| 3,343,832 A | * | 9/1967 | Gustafsson | 267/64.15 |
| 3,647,270 A | * | 3/1972 | Althaus | 305/146 |
| 3,787,097 A | * | 1/1974 | Orr | 305/145 |
| 3,912,335 A | * | 10/1975 | Fisher | 305/148 |
| 4,854,650 A | * | 8/1989 | Getz et al. | 305/148 |
| 5,794,731 A | * | 8/1998 | Klaus | 180/9.56 |
| 6,001,036 A | * | 12/1999 | O'Brien et al. | 474/110 |
| 6,027,185 A | * | 2/2000 | Crabb | 305/148 |
| 6,682,155 B2 | | 1/2004 | Hoff et al. | |
| 2003/0117017 A1 | | 6/2003 | Hoff | |

FOREIGN PATENT DOCUMENTS

| | | | |
|---|---|---|---|
| DE | 3404517 | * | 8/1985 |
| JP | 4-133833 | * | 5/1992 |

* cited by examiner

*Primary Examiner*—Russell D. Stormer
(74) *Attorney, Agent, or Firm*—Liell & McNeil

(57) ABSTRACT

A track type work machine is provided including a roller frame having a rotatable idler mounted at an end thereof. A gas spring is operable to absorb selected loads on the idler, and is isolated from loads transverse to a reciprocation axis of the gas spring by a recoil system. A method of providing for load absorption from the idler is also provided. The method includes positioning a gas spring between the idler and a roller frame of the work machine, and operably coupling the idler to the gas spring to selectively transmit loads from the idler thereto.

20 Claims, 4 Drawing Sheets

IDLER RECOIL AND ADJUSTMENT SYSTEM FOR TRACK TYPE WORK MACHINE

TECHNICAL FIELD

The present disclosure relates generally to track type work machines, and relates more particularly to an idler recoil system for a track type work machine having a gas spring operable to absorb selected loads on the idler.

BACKGROUND

Track type work machines are in widespread use in construction, mining, forestry, and similar industries. In particular, bulldozers, cranes and pavers are commonly seen track type work machines along roads, freeways and at construction sites. "Tracks" rather than wheels are typically used on work machines operating in environments where creating sufficient traction with conventional tires is problematic or impossible. Rather than rolling across a work surface on wheels, track type work machines utilize one or more tracks extending about a plurality of rolling elements. Such tracks are typically made up of a loop of coupled metal links having outer sides that engage the ground or work surface, and inner sides travelling about the rolling elements, which can include various drive rollers, support rollers, tensioners and "idlers."

An idler in a track type work machine is a rolling element that passively rolls against the track and supports the inner side of the track as it rolls about the idler. Traditionally, idlers included a smooth cylindrical outer surface that rolled along rails defined by the individual track links, or by the idler itself. Newer designs, however, often include a plurality of teeth that engage against the bushings that join the track links, similar to a gear wheel.

While contemporary idler designs offer numerous advantages over traditional, non-toothed idlers, they have given rise to various new problems and engineering challenges. Over the course of work machine operation, debris can more readily find its way between a toothed idler and track links than in a traditional design. As a result, debris such as a rock can actually become lodged between a portion of a track link and the teeth, or pockets between the teeth, of the rotating idler. Similar problems are associated with the toothed sprocket and track on the roller frame opposite the idler.

Lodging of a rock between the idler or sprocket and the track can effectively lengthen the distance traversed by the track, and/or increase the tension thereof having two possible outcomes. First, if the work machine track components are sufficiently robust, the rock will be crushed. Alternatively, the rock may actually strain the track and associated components to the point at which something breaks.

In an attempt to avoid the rock-crushing, track-breaking alternatives, designers have developed a variety of means to allow debris to simply roll through, for example by actually recoiling the idler, to lower or maintain the track tension. One design incorporates a coil spring with the track roller frame. The coil spring is positioned such that it can absorb recoil forces on the idler, such as while a rock is lodged between the idler or sprocket and the track. In general, it is desirable to limit the frequency of recoil events in the track system, as they tend to lead to excessive wear of the components. With a coil spring, recoil frequency would generally be limited by utilizing a coil spring having a relatively high spring constant such that it will only be compressed when a recoil force above a certain threshold is encountered.

While such a design is relatively simple, a particularly large, heavy-duty coil spring can be necessary to provide sufficient resistance to recoil.

In many work machine designs, known coil springs having a sufficient spring constant may not actually fit into the track roller frame, therefore being difficult or impossible to utilize. Such coil springs must also typically be surrounded by a steel structure on the roller frame for safety and protection of the spring itself. Further still, coil springs made of common known materials may not have a sufficiently linear spring force as a function of the degree of compression. In other words, it may become exceedingly difficult to further compress a coil spring when it is close to full recoil, confounding its intended purpose.

In recent years, designers have proposed various alternatives to the aforementioned coil spring designs, some meeting with significant success. One example of a non-coil-spring idler recoil design incorporates a combined pneumatic and hydraulic system to absorb loads on the idler. In such a design, recoil forces on the idler are absorbed by displacing hydraulic fluid, and simultaneously compressing gas in an accumulator. While these more modern designs offer certain advantages over coil spring designs, they must typically be connected with the work machine hydraulic system, requiring hydraulic lines to extend between the track assembly and the work machine body, a design that is both complex and apt to require frequent maintenance. One particular design utilizes a gas accumulator mechanically linked with the idler to absorb recoil forces thereon. U.S. Pat. No. 6,682,155 to Hoff, et al. is directed to one such system. Hoff, et al. describe a track tension adjustment actuator, operable to selectively reduce tension on the idler wheel in a track type work machine, especially when the work machine is traveling. The actuator of Hoff, et al. includes a hydraulic cylinder housing, and a recoil piston disposed within the cylinder housing and coupled with the idler wheel. The cylinder housing and recoil piston form a recoil chamber that is pressurized to urge the recoil piston away from the work machine drive wheel, tensioning the track. Another known design is described in U.S. patent application Ser. No. 10/325,362, now abandoned. The '362 disclosure is directed to a track tension adjustment mechanism, in particular a system, like Hoff, et al., wherein tension on an idler wheel of a track type work machine is reduced when the machine is traveling. The '362 disclosure includes a track tensioning system having an idler wheel, a drive wheel, and a drive track. A hydraulic motor is operable to advance the drive wheel, and an actuator having a recoil chamber is coupled with the idler wheel to urge the idler wheel away from the drive wheel and thereby tension the track. A controlled quantity of hydraulic fluid may be delivered to the actuator to adjust the track tension as needed.

While the above systems offer various advantages, particularly in that a relatively smaller, simpler recoil system can be made, high pressure gas accumulators have inherent sealing problems, particularly where they are subjected to side loads on pistons therein.

The present disclosure is directed to one or more of the problems or shortcomings set forth above.

SUMMARY OF THE INVENTION

In one aspect the present disclosure provides a track type work machine including, a roller frame and a rotatable idler mounted proximate an end of the roller frame. The idler is movable along a recoil axis with respect to the roller frame. A plural component recoil system is operably positioned between the roller frame and the idler, and includes a gas spring having a reciprocation axis aligned with the recoil axis. The gas spring is coupled with the idler and operable to absorb selected loads thereon, at least one component of the recoil system having a laterally movable interface with another component of the recoil system. Lateral movement isolates the gas spring from loads transverse to the reciprocation axis.

In another aspect, the present disclosure provides an idler recoil system for a recoil machine including an idler yoke, and a reciprocable shaft. The shaft includes a longitudinal axis and is coupled with the idler yoke at a contact joint. The contact joint includes adjacent joint surfaces laterally movable relative to one another to isolate the shaft from selected loads on the idler yoke. A gas spring is provided having a reciprocation axis aligned with the longitudinal axis, the gas spring being operable to absorb loads transmitted to the shaft from the idler yoke.

In yet another aspect, the present disclosure provides a method of providing for load absorption from an idler in a track type work machine. The method includes the steps of operably positioning a gas spring between the idler, and a roller frame of the work machine to absorb loads on the idler in a direction aligned with a reciprocation axis of the gas spring. The method further includes the step of isolating the gas spring from loads transverse to the reciprocation axis.

DETAILED DESCRIPTION

Figure 1:
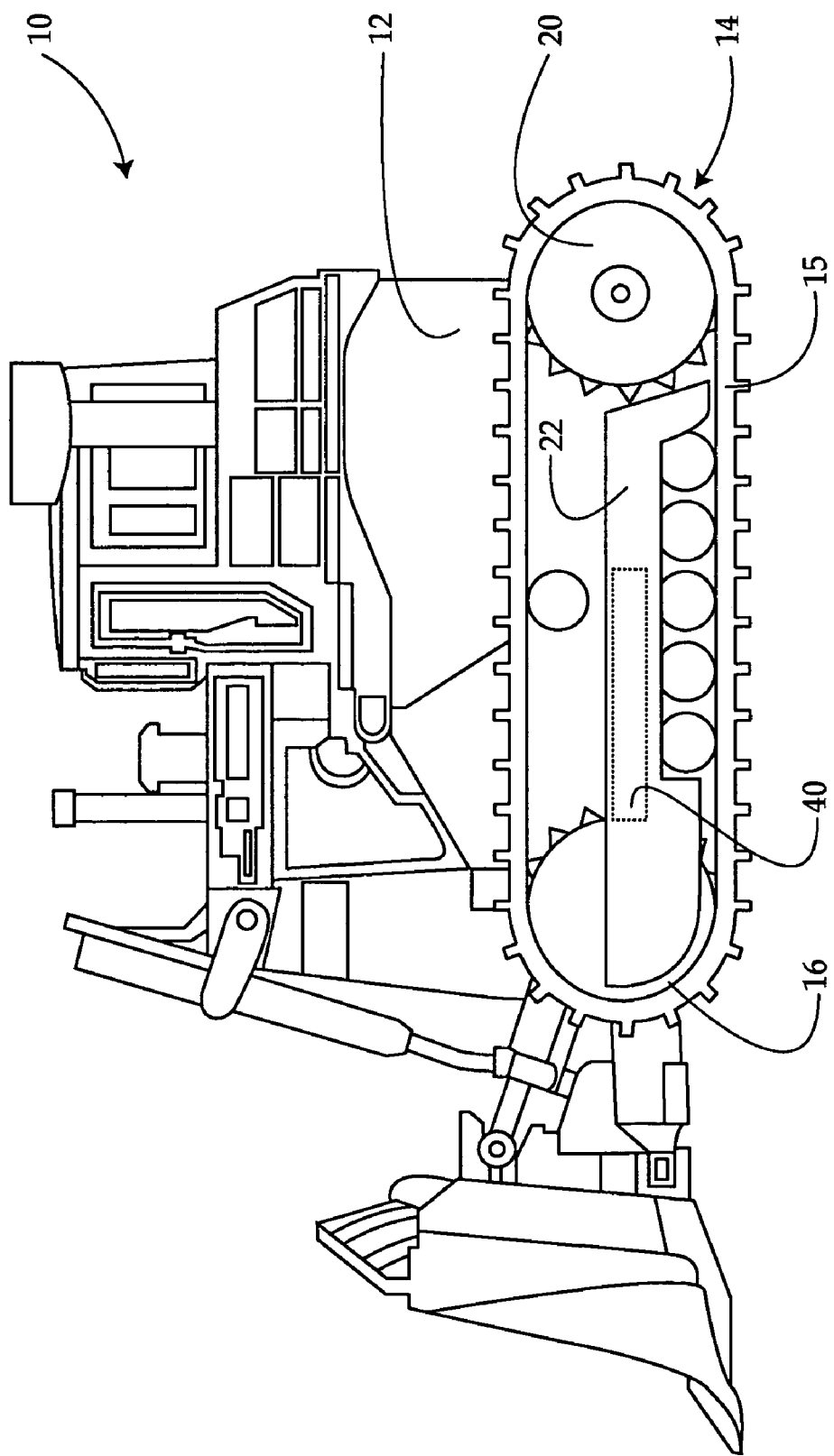
FIG. 1 is a side view in perspective of a work machine according to the present disclosure.

Referring to FIG. 1, there is shown a track type work machine 10, for example a tractor or bulldozer, in accordance with a preferred embodiment of the present disclosure. Work machine 10 includes a work machine body 12 having a track assembly 14. A drive sprocket 20 is disposed at one end of track assembly 14 and is operable to drive a track 15 to propel work machine 10. An idler 16 is mounted proximate an end of a roller frame 22 and rotates against track 15 at an end of track assembly 14, in a conventional manner opposite drive sprocket 20. A recoil system 40, shown in phantom, is mounted to roller frame 40 and is operable to absorb recoil loads on idler 16, as described herein.

Figure 2:
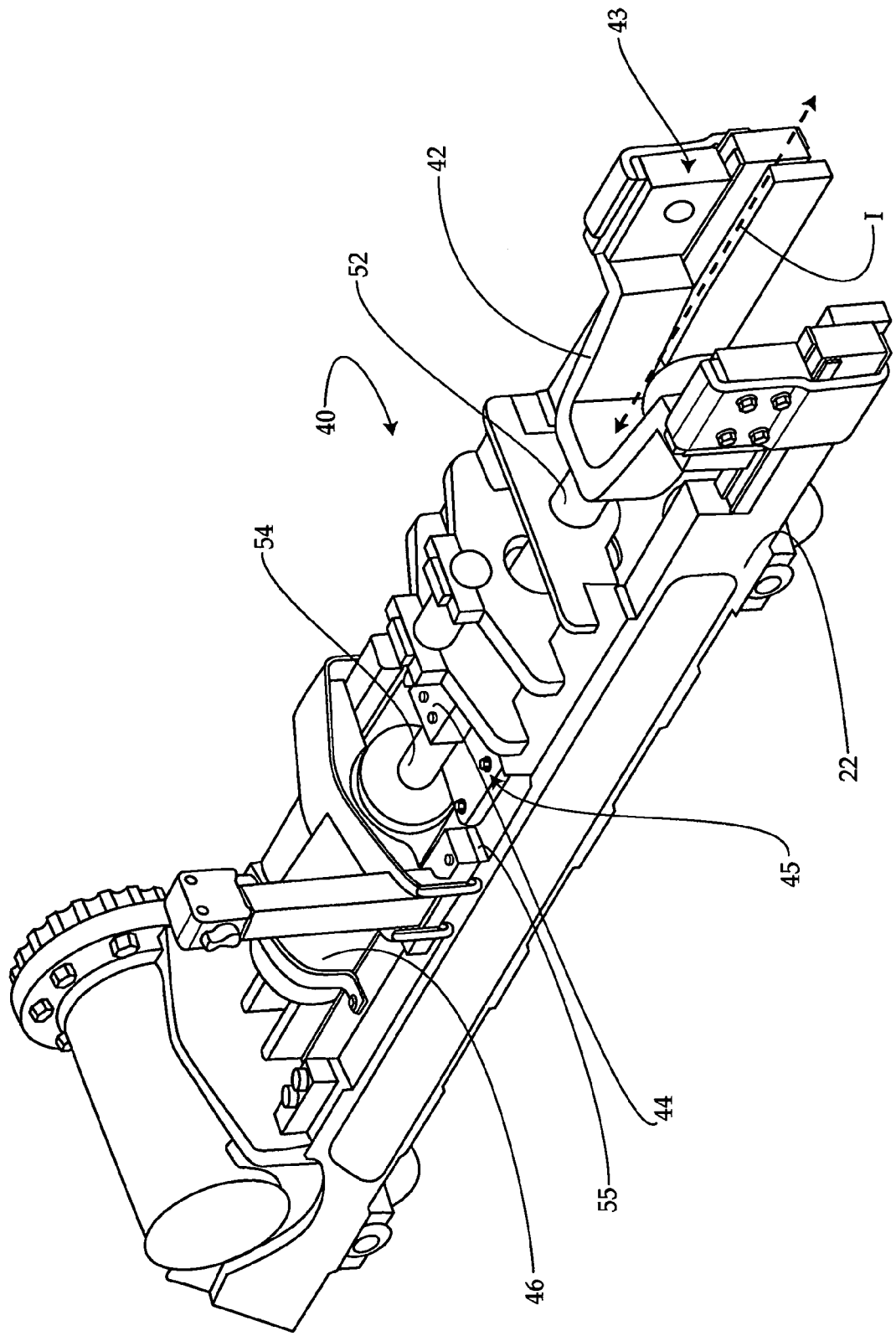
FIG. 2 is a perspective view of an idler recoil system for a work machine according to the present disclosure.

Turning to FIG. 2, there is shown in perspective recoil system 40 of FIG. 1, mounted to roller frame 22. In a preferred embodiment, recoil system 40 includes an idler yoke 42 configured to support idler 16 in support blocks 43, although alternative supporting and/or mounting means for idler 16 are possible. A rod, or recoil shaft 52 is disposed adjacent idler yoke 42 and transmits loads thereon through recoil system 40, as described herein. Idler yoke 42 is preferably movable in directions transverse to a longitudinal axis L of shaft 52, to absorb vertical, sideways, and twisting loads on idler 16, in a conventional manner. An adjuster 44, for example an hydraulic adjuster, is preferably disposed adjacent shaft 52, and is operable to adjust the position of idler yoke 42, and hence idler 16, relative to a gas spring 46. In a preferred embodiment, adjuster 44 includes both a fluid inlet and a fluid outlet (neither shown) to allow the introduction or evacuation of hydraulic fluid there from, correspondingly adjusting idler 16 forward or backward. Idler 16 is in contact with track 15, and adjustment thereof with adjuster 44 can therefore adjust a track tension of track assembly 14.

Figure 3:
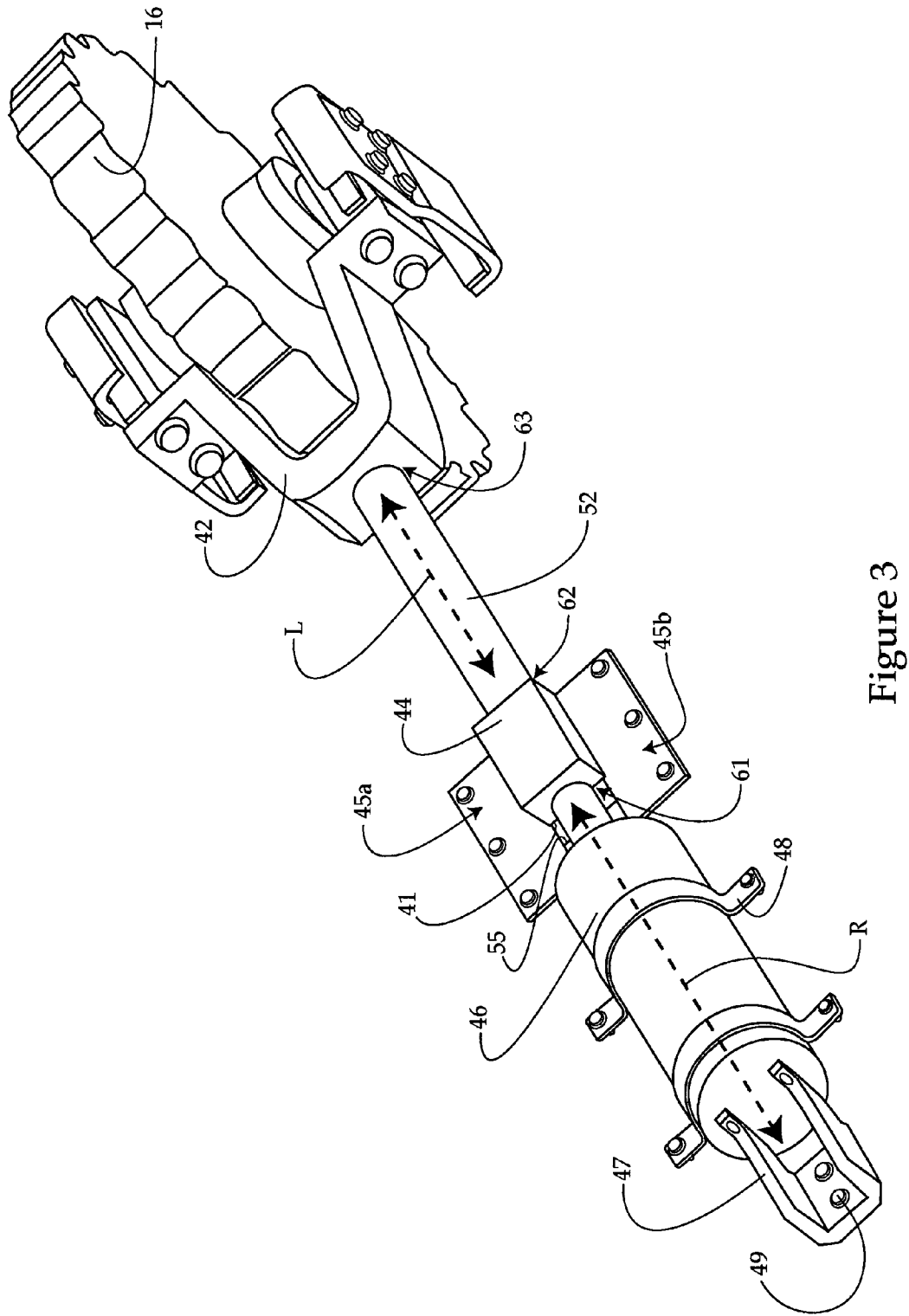
FIG. 3 is also a perspective view of an idler recoil system according to the present disclosure.
Figure 4:
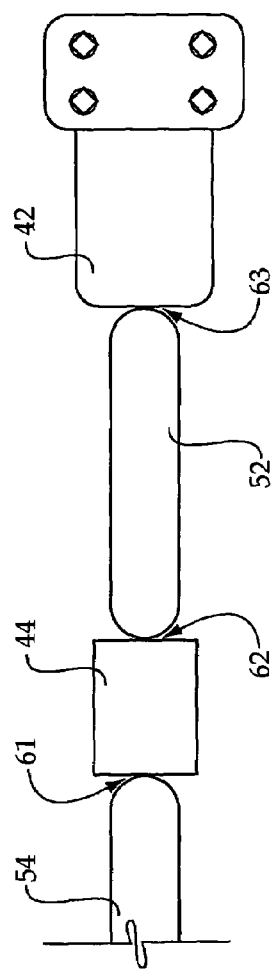
FIG. 4 is a schematic view of an idler recoil system according to the present disclosure.

Gas spring 46 may be any suitable sealed gas container, and preferably includes a piston 54, which may be thought of as a second recoil shaft, adjacent adjuster 44. In a preferred embodiment, a recoil axis R of gas spring 54, also an axial centerline of piston 54, is aligned with longitudinal axis L of shaft 52. Further, recoil axis R is preferably intersecting and orthogonal to a line extending through an axis of rotation of idler 16, preferably when idler 16 is at a center, rest position. Gas spring 46 may be pressurized with any suitable compressible fluid, for example, nitrogen or air. Referring also to FIG. 3, gas spring 46 is preferably mounted to roller frame 22 with one or more metallic straps 48 or similar devices, allowing relatively easy removal from recoil system 40. Thus, when a leaky, insufficiently pressurized or otherwise faulty gas spring needs to be replaced, it is decoupled and removed from roller frame 22 by unfastening straps 48.

A spacer 49 is further preferably provided, and disposed between gas spring 46 and an end of roller frame 22. Spacer 49 is provided to transmit forces or loads on gas spring 26 to roller frame 22, and is preferably equipped with one or more mounting apertures 49 for bolting the same to roller frame 22. In a preferred embodiment, mounting apertures 49, and the mounting bolts therewith, are configured having a relatively large tolerance, allowing spacer 49 to move slightly relative to roller frame 22 and avoid shearing the bolts connecting the same therewith.

Figure 5:
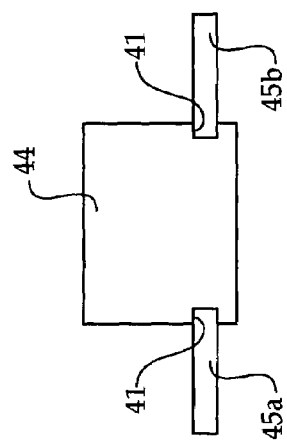
FIG. 5 is a schematic view of an adjuster guide configuration suitable for use in an idler recoil system according to the present disclosure.

Adjuster 44 is preferably rectangular, and reciprocates relative to roller frame 22. Adjuster 44 is preferably guided in an adjuster guide 45 having a pair of guide plates 45a and 45b at opposite sides thereof, preferably via a grooved engagement therewith. As used herein, the term "grooved engagement" should be understood to refer to a design wherein at least one of guide plates 45a and 45b, or adjuster 44 includes one or more grooves 41. FIGS. 3 and 5 illustrate grooves 41 in adjuster 44. Each of the one or more grooves 41 slidably engages with a mating feature on the other of adjuster 44 or guide plates 45a and 45b, for example an edge of guide plates 45a and 45b. In a preferred embodiment, grease is placed at the interface of groove(s) 41 and guide plates 45a and/or 45b. The described engagement restricts rotational movement of adjuster 44 and lateral displacement of the same during recoil of idler 16. In a preferred embodiment, one of adjuster 45 and roller frame 22 is equipped with a stop 55 that restricts displacement of adjuster 44 in a recoil direction past a predetermined point. Thus, when idler 16 experiences a sufficient load transmitted to adjuster 44 and thenceforth to gas spring 46, adjuster 44 will reach a maximum point of retraction, against stop 55. This feature can prevent overpressurization of gas spring 46 by limiting the extent of recoil of piston 54.

Gas spring 46 is operable to absorb only selected loads, along axis R. Sideways, vertical and twisting movements of idler 16 are preferably isolated from gas spring 46, to the extent they are transferred into recoil system 40. In a preferred embodiment, at least one contact joint is located between idler yoke 42 and gas spring 46, to transmit loads to gas spring 46 along the reciprocation axis thereof. As used herein, the term "contact joint" should be understood to refer to a mechanical coupling wherein two adjacent members include surfaces positioned in contact with each other, but not physically attached. In a preferred embodiment, shaft 52 and idler yoke 42 each define a portion of a contact joint 63 therebetween, for example, including a convex surface on one of the idler yoke 42 and shaft 52, and a flat or similar shape adjoining the convex surface and disposed on the other component. Accordingly, idler yoke 42 will transmit force or loads to shaft 52 substantially only along axis L. The transfer of loads on idler 16 transverse to the longitudinal axis L of shaft 52 and/or the reciprocation axis R of gas spring 46 will most preferably be negligible. This is possible because the convex-flat interface of joint 63 will allow one of the components to slip laterally relative to the other rather than transmitting a transverse or twisting load. Similarly, because shaft 52 and idler yoke 42 are not physically attached, any loads on idler 16 that tend to extend the same, rather than recoiling, will not be transferred to shaft 52. Shaft 52 may be likewise coupled with adjuster 44 via a contact joint 62, having a similar configuration. A third contact joint 61 is also preferably disposed between piston 54 and adjuster 44, preferably being defined in part by each of the same. It should be appreciated that the term "contact joint" refers generally to any mechanical coupling wherein lateral load transmission is small or nonexistent, but axial load transmission is possible in at least one axial direction.

INDUSTRIAL APPLICABILITY

Referring to the drawing figures generally, idler recoil system 40 is preferably operable when a load on idler 16 sufficient to compress gas spring 46 is encountered. In a preferred embodiment, gas spring 46 is pressurized to a degree such that a load approximately equal to the work machine weight is necessary to initiate compression thereof. In many standard work machine designs, the track assembly is designed and configured such that the tracks are strong enough to support a load equaling the weight of the work machine before breaking. The actual pressurization of gas spring 46 may therefore be slightly less than that corresponding to the vehicle weight such that idler 16 will begin to recoil prior to breaking the tracks.

Gas spring 46 is also preferably equipped with a gas exchange valve (not shown) such that its pressurization can be adjusted, allowing recoil system 40 to accommodate different selected loads, depending upon operating conditions. A further advantage of both the adjustability of the pressurization of gas spring 46, and its being readily replaceable, is that recoil system 40 can operate as desired over a range of different temperatures. The relative pressurization of gas spring 46 can vary significantly between a cold environment such as Antarctica, and a hot environment close to the equator, and adjustment of gas spring 46, or switching with another gas spring may be desirable. Moreover, the rigidity of the components of track assembly 14 can also vary with temperature, and thus the necessary force to break the track, and desired force necessary to begin compression of gas spring 46 can both vary.

During operation, rocks or other debris may become trapped between idler 16 or sprocket 20 and track 15. As debris is drawn into the loop of track 15, the tension on track 15 increases. Where this tension increase is less than an approximate weight of work machine 10, gas spring 46 will remain in a maximally extended state, stretching track 15 or crushing the debris. Where the track tension approaches the work machine weight, however, gas spring 46 will begin to compress, absorbing a load along reciprocation axis R. Contact joints 61, 62 and 63 transfer a load on idler 16, also on idler yoke 42, rearward in recoil system 40 to adjuster 44 and ultimately gas spring 46. Because the respective contact joints preferably negligibly transfer loads transverse to axes R and L of gas spring 46 and/or shaft 52, respectively, vertical, twisting and side loads on idler 16 are isolated from gas spring 46, protecting the sealing thereof.

As a recoil event progresses, un-crushed debris between track 15 and idler 16 or sprocket 20 will be passed out, and as the load on gas spring 46 drops below the approximate work machine weight, gas spring 46 will re-extend adjuster 44 and idler yoke 42 to restore the components to a normal working condition.

It has been generally found that higher gas spring preloads are desirable than in many earlier designs. Thus, wear of the various components of recoil system 40 will be reduced by limiting the frequency of recoil events with a more highly pre-loaded gas spring, and the frequency with which debris is crushed will be increased.

The present description is for illustrative purposes only, and should not be construed to narrow the breadth of the present disclosure in any way. Thus, those skilled in the art will appreciate that various modifications might be made to the presently disclosed embodiments without departing from the spirit and scope of the present disclosure. For example, although the described convex-flat interface in joints 61, 62 and 63 is preferred, other types of component interfaces are contemplated, for example, where both surfaces are convex or hemispheric. Further, the respective components might be linked together, so long as lateral load transmission is minimized. Other aspect, features and advantages will be apparent upon an examination of the attached drawing Figures and appended claims.

What is claimed is:

1. A track type work machine comprising:
  a roller frame;
  a rotatable idler mounted proximate an end of said roller frame and being movable along a recoil axis with respect to the same; and
  a plural component recoil system operably positioned between said roller frame and said idler and including a gas spring having a reciprocation axis aligned with said recoil axis;
  said gas spring being coupled with said idler and operable to absorb selected loads thereon, at least one component of said recoil system being configured to slip relative to another component of said recoil system to isolate said gas spring from loads within said recoil system which are transverse to said reciprocation axis.

2. The track type work machine of claim 1 comprising:
  an idler yoke supporting a shaft of said idler, said idler yoke being movable transverse to the reciprocation axis of said gas spring; and
  an adjuster disposed between said gas spring and said idler yoke and operable to adjust a relative horizontal position therebetween;

said gas spring being unattached but coupled with said adjuster and said idler yoke by a contact joint defined in part by at least one of said gas spring, said adjuster and said idler yoke.

3. The track type work machine of claim 2 comprising:
at least one recoil shaft mounted on said roller frame to transmit loads between said idler and said gas spring;
said recoil shaft including a contact joint with at least one of said idler yoke, adjuster and gas spring, said contact joint comprising a convex portion on one of said recoil shaft, idler yoke, adjuster and gas spring.

4. The track type work machine of claim 3 wherein said gas spring comprises a piston axially aligned with said at least one recoil shaft, said piston defining a portion of a contact joint between said gas spring and said adjuster.

5. The track type work machine of claim 1 comprising at least one contact joint between components of said idler recoil system, said at least one contact joint being configured to allow said slip and including adjacent joint surfaces of the at least one component of said idler recoil system and the another component of said idler recoil system.

6. The track type work machine of claim 5 wherein said plural component recoil system comprises:
an idler yoke;
a reciprocable shaft disposed between said idler yoke and said gas spring; and
an adjuster also disposed between said idler yoke and said gas spring and configured to adjust relative positions thereof;
wherein said at least one contact joint comprises a contact joint between at least one of, said idler yoke and said reciprocable shaft, said adjuster and said gas spring, and said reciprocable shaft and said adjuster.

7. A track type work machine comprising:
a roller frame;
a rotatable idler mounted proximate an end of said roller frame and being movable alone a recoil axis with respect to the same; and
a plural component recoil system operably positioned between said roller frame and said idler and including a gas spring having a reciprocation axis aligned with said recoil axis;
said gas spring being coupled with said idler and operable to absorb selected loads thereon, at least one component of said recoil system being configured to slip relative to another component of said recoil system to isolate said gas spring from loads within said recoil system transverse to said reciprocation axis;
an idler yoke supporting a shaft of said idler, said idler yoke being movable transverse to the reciprocation axis of said gas spring;
an adjuster disposed between said gas spring and said idler yoke and operable to adjust a relative horizontal position therebetween;
said gas spring being unattached but coupled with said adjuster and said idler yoke by a contact joint defined in part by at least one of said gas spring, said adjuster and said idler yoke;
at least one recoil shaft mounted on said roller frame to transmit loads between said idler and said gas spring;
said recoil shaft including a contact joint with at least one of said idler yoke, adjuster and gas spring, said contact joint comprising a convex portion on one of said recoil shaft, idler yoke, adjuster and gas spring;
an adjuster guide mounted to said roller frame, said adjuster guide restricting rotation and lateral displacement of said adjuster in directions transverse to said reciprocation axis;
wherein one or both of said adjuster and said adjuster guide defines at least one groove slidably engageable with a mating feature on the other of said adjuster and said adjuster guide.

8. The track type work machine of claim 7 wherein:
said adjuster guide comprises first and second guide plates disposed on opposite sides of said adjuster; and
said adjuster is rectangular and comprises grooves along opposite sides thereof, each of said grooves slidably receiving an edge of said first or second guide plate.

9. An idler recoil system for a work machine comprising:
an idler yoke;
a reciprocable shaft having a longitudinal axis and being coupled with said idler yoke at a contact joint;
said contact joint including adjacent joint surfaces configured to transfer loads aligned with said longitudinal axis and being laterally movable relative to one another in directions transverse to said longitudinal axis to isolate said shaft from selected loads on said idler yoke; and
a gas spring having a reciprocation axis aligned with said longitudinal axis, said gas spring operable to absorb loads transmitted to said shaft from said idler yoke.

10. The idler recoil system of claim 9 comprising an adjuster slidably disposed between said gas spring and said idler yoke, said adjuster operable to adjust a position of said gas spring relative to said idler yoke and defining a portion of a contact joint therebetween.

11. The idler recoil system of claim 10 comprising:
an adjuster guide guiding movement of said adjuster and restricting rotation and displacement of the same in directions transverse to the longitudinal axis of said recoil shaft.

12. An idler recoil system for a work machine comprising:
an idler yoke:
a reciprocable shaft having a longitudinal axis and being coupled with said idler yoke at a contact joint:
said contact joint including adjacent joint surfaces laterally movable relative to one another to isolate said shaft from selected loads on said idler yoke:
a gas spring having a reciprocation axis aligned with said longitudinal axis, said gas spring operable to absorb loads transmitted to said shaft from said idler yoke;
an adjuster slidably disposed between said gas spring and said idler yoke, said adjuster operable to adjust a position of said gas spring relative to said idler yoke and defining a portion of a contact joint therebetween;
an adjuster guide guiding movement of said adjuster and restricting rotation and displacement of the same in directions transverse to the longitudinal axis of said recoil shaft;
wherein at least one of said adjuster and said adjuster guide includes a groove and the other of said adjuster and adjuster guide comprises an edge portion slidable in said groove.

13. The idler recoil system of claim 12 comprising a contact joint defined in part by said adjuster and also in part by a piston of said gas spring.

14. The idler recoil system of claim 13 wherein said gas spring defines a reciprocation axis oriented coaxially with said recoil shaft.

15. The idler recoil system of claim 14 comprising:
a roller frame;
a rotatable idler mounted in said idler yoke proximate an end of said roller frame, said idler having a center position;
wherein at said center position an axis of rotation of said idler is oriented orthogonal to and intersects a line extending through said gas spring reciprocation axis.

16. The idler recoil system of claim 15 wherein said gas spring is a removable gas spring comprising a gas exchange valve to adjust a gas pressure thereof.

17. A method of providing for load absorption from an idler in a track type work machine comprising the steps of:
operably positioning a gas spring between the idler and a roller frame of the work machine to absorb loads on the idler, in a direction aligned with a reciprocation axis of the gas spring; and
isolating the gas spring from loads transverse to the reciprocation axis, including allowing slip between adjacent components of an idler recoil system of the work machine in directions transverse to the reciprocation axis.

18. The method of claim 17 comprising the step of pressurizing the gas spring to a predetermined quantity such that displacement of the gas spring is initiated only upon transmitting a selected load approximately equal to or greater than a weight of the work machine.

19. The method of claim 18 wherein the step of positioning the gas spring between the idler and the roller frame comprises:
positioning a cylindrical gas spring between the idler and the roller frame, the gas spring having a diameter less than or equal to a width of a track of the work machine, and a length less than a length of the roller frame.

20. A method of providing for load absorption from an idler in a track type work machine comprising the steps of:
operably positioning a gas spring between the idler and a roller frame of the work machine to absorb loads on the idler, in a direction aligned with a reciprocation axis of the gas spring;
isolating the gas spring from loads transverse to the reciprocation axis;
pressurizing the gas spring to a predetermined quantity such that displacement of the gas spring is initiated only upon transmitting a selected load approximately equal to or greater than a weight of the work machine;
wherein the step of positioning the gas spring between the idler and the roller frame comprises: positioning a cylindrical gas spring between the idler and the roller frame, the gas spring having a diameter less than or equal to a width of a track of the work machine, and a length less than a length of the roller frame;
positioning an adjuster between the gas spring and the idler, wherein the adjuster is operable to adjust a relative position between the same; and
installing a stop on the roller frame to limit horizontal displacement of the adjuster in a direction aligned with an axis of reciprocation of the gas spring, wherein the stop limits compression of the gas spring to a predetermined degree.

* * * * *

UNITED STATES PATENT AND TRADEMARK OFFICE
CERTIFICATE OF CORRECTION

PATENT NO.        : 7,252,349 B2
APPLICATION NO.   : 10/993733
DATED             : August 7, 2007
INVENTOR(S)       : Livesay et al.

Page 1 of 1

It is certified that error appears in the above-identified patent and that said Letters Patent is hereby corrected as shown below:

In Column 7, Line 39, in Claim 7, delete "alone" and insert -- along --, therefor.

Signed and Sealed this

Fifteenth Day of July, 2008

JON W. DUDAS
*Director of the United States Patent and Trademark Office*